March 24, 1931.    A. E. CARLISS    1,797,324

AIR PRESSURE GAUGE

Filed April 25, 1928    2 Sheets-Sheet 1

Fig.1ª

INVENTOR.
Albert E. Carliss
BY James L. Stewart
ATTORNEYS.

March 24, 1931.  A. E. CARLISS  1,797,324
AIR PRESSURE GAUGE
Filed April 25, 1928    2 Sheets-Sheet 2

INVENTOR.
Albert E. Carliss
BY James L. Stewart
ATTORNEYS.

Patented Mar. 24, 1931

1,797,324

UNITED STATES PATENT OFFICE

ALBERT E. CARLISS, OF FLORAL PARK, NEW YORK, ASSIGNOR TO ACME AIR APPLIANCE CO., INC., A CORPORATION OF NEW YORK

AIR-PRESSURE GAUGE

Application filed April 25, 1928. Serial No. 272,625.

This invention relates to the art of air pressure gauges, and particularly to that type of gauge wherein what is known as a "Bourdon tube" is employed. It has for its object the supplying of means by which the operation of such Bourdon tube will be made more certain and efficient.

What is known as a Bourdon tube as employed in air gauges consists of a tube of thin flexible metal open at one end and otherwise closed. Normally such a tube is bent in the arc of a circle, the base or open end of the said tube being anchored to a suitable support. Air under pressure is introduced into the tube at the point of such anchorage or base, and such air pressure operates more or less to enlarge the arc of the normal form of such a tube, and causes the same to tend to approach a straight line. With the release of such air pressure, said tube has a tendency to resume its normal form.

As previously stated, such tube is anchored to a fixed support at one end where the air under pressure is introduced, and the opposite end of said tube is free and unrestrained to move from its normal position to an abnormal position, dependent upon the degree of air pressure introduced into the tube. For the purpose of determining the degree of air pressure, a pivotally mounted index hand is caused to move over the face of a scale by means of a link interposed between the free end of the tube and said index hand so that when the free end of the tube is moved by the air pressure introduced into the tube, the hand is caused to respond to such movement. Given that the degree of air pressure introduced into the tube is known, it is possible to adjust the index hand in association with a scale so as to indicate the degree of pressure introduced into the tube.

A difficulty is encountered, however, in the operation of gauges wherein a Bourdon tube is employed, due to the fact that it is impossible to manufacture such tubes with a degree of accuracy with respect to their flexibility so as to make a plurality of such tubes operate in exactly the same way under similar degrees of pressure. Consequently the free end of said tube which, as previously stated, is linked to operate the index hand, performs its function in an uncertain and variable manner, hence giving a reading which is correspondingly variable according to the variation in the flexibility or other characteristics of such tube.

This invention relates particularly to means whereby a variation in the movement of the free end of the said Bourdon tube may be reduced to a minimum. This is accomplished by providing means whereby the movement of the free end of the tube will be confined or limited to operate within a predetermined arc of a circle. Under such conditions it is possible to produce a gauge that will operate with far greater accuracy and certainty than has been possible heretofore.

The invention is illustrated in the accompanying drawings, the several parts being indicated by numerals, like numerals referring to like parts.

Figure 1a is a detail, partly in section.

Figure 1:
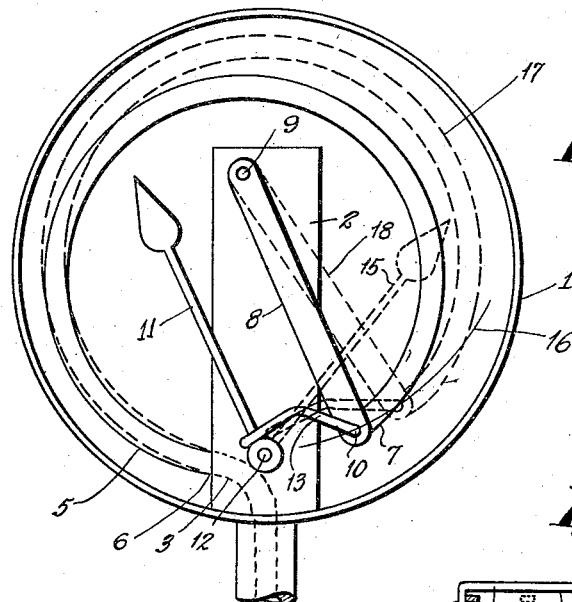
Figure 1 is a plan view of a pressure gauge, the top and scale having been removed to show the operative parts.

1 is a casing adapted to enclose the operating mechanism of a gauge. 2 is a central support suitably mounted within said casing. 3 is a conduit shown in dotted lines through the base of said central support. 4 is a tube connected with said conduit adapted for the supply of air under pressure. 5 is a Bourdon tube anchored at 6 to said central support and in communication with said conduit 3. 7 indicates the free end of the Bourdon tube. 8 is a link pivotally mounted at one end on the central support 2 at 9, and the other end of said link 8 is pivotally secured at 10 to the free end 7 of the Bourdon tube. 11 is an index hand pivotally mounted on the support 2 at 12. 13 is a link secured to the free end of the Bourdon tube 7 at 10, said link being provided with a hook 14 adapted to engage the index hand 11 to move the same over the face of a dial not shown. When said tube is operated under air pressure, it causes said index hand to move to the position 15 and remain in that position to give opportunity for a reading, as indicated by the hand 11 and the scale over which it moves. When the air pressure is relieved, the link 13 falls back to its normal position without affecting the position of the index hand. 16 is a line indicating that predetermined arc in which it is the purpose of this invention to limit or confine the movement of the free end of the Bourdon tube 7. The dotted line 17 indicates the movement of the Bourdon tube when subject to air pressure, while the dotted line 18 illustrates the movement of the link 8 when the tube is subject to air pressure. In Figure 1 said link 8 is illustrated as of shorter length than in Figure 2, where 19 illustrates a longer link, which in that case is pivotally mounted at 20. It will be obvious that the curvature of the arcs 16 and 21 will depend on the position of the center of the circle of which said arcs are part with reference to the position of the free end of the tube, that is, the longer the radius, the flatter the arc.

Figure 3:
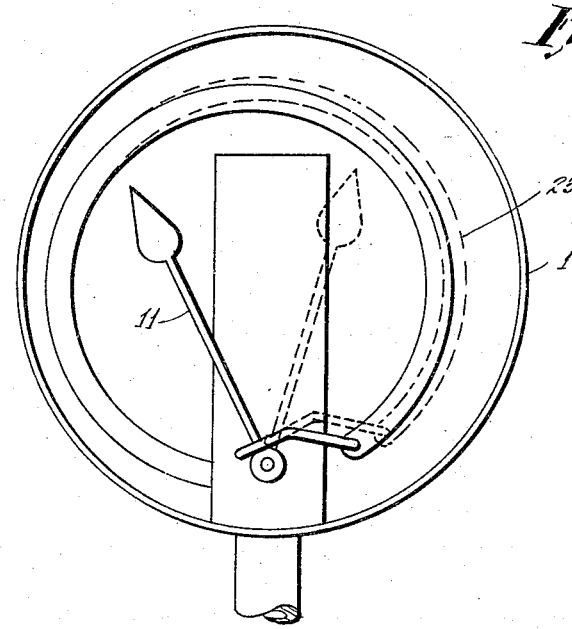
Figure 3 is a plan view of a gauge of conventional type employing a Bourdon tube, the same being familiar in the art.
Figure 5:
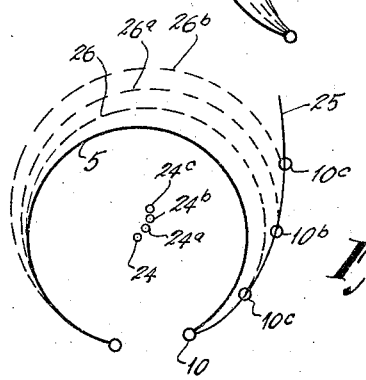
Figure 5 is a diagrammatic view illustrating the operation of a Bourdon tube of the type illustrated in Figure 3.

Figure 3, as previously stated, is a plan view of a gauge employing a Bourdon tube of the conventional type. The operation of such a tube under varying conditions of air pressure is exhibited diagrammatically in Figure 5 wherein the tube in its normal position is indicated by a solid line as 5, and the position of the tube under varying degrees of pressure is exhibited in broken lines designated generally as 26, 26a and 26b. It will be noted that under the said varying degrees of air pressure, the centers of the circles produced under such varying conditions of air pressure vary in position as 24, 24a, 24b, and 24c, and in like manner the position of the free end of the tube varies, as indicated at 10, 10a, 10b and 10c. It will also be noted that the curvature of a line drawn through the free ends of the tube as diagrammatically exhibited takes the form as indicated at 25, and it will be observed that this line 25 does not take the form of the arc of a circle as do the arcs indicated as 16 and 21. Indeed it may be said that under the varying conditions incident to the varying characteristics of Bourdon tubes, there is no way of definitely determining what form or direction the line 25 may take, for there is no means provided for limiting the movement of the free end of the tube. Some tubes may be affected in one way and some in another, that is to say, the free end of the tube may be more active in its movement towards conformity with a straight line than the rear end. It is believed to be impossible to manufacture a tube that will conform to any particular path, as suggested by the line 25.

Figure 4:
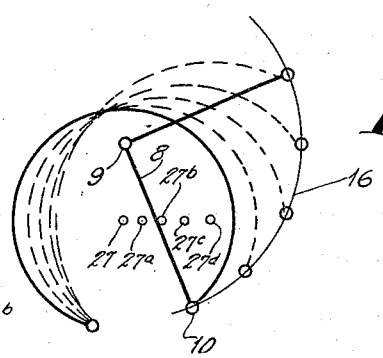
Figure 4 is a diagrammatic view illustrating the operation of a Bourdon tube under the conditions established in this case.

In Figure 4 a diagram is presented showing the operation of the tube under the conditions heretofore described, where the movement of the free end of the tube is limited by the link 8 or 19. It will be observed in this diagram that the centers 27, 27a, 27b, 27c and 27d all fall within a horizontal plane and that such centers will be invariable. It will also be noted that the arc 16 is definitely related to the central pivotal point 9 so that the said arc 16 is always the same, by reason of the fact that the free end of the tube is pivotally connected with the link 8, and that this link is pivoted at 9. The movement of the said free end of said tube is therefore positively confined to a movement within the arc 16.

Figure 2:
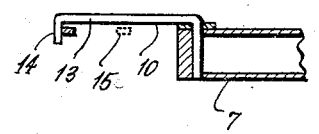
Figure 2 is the same as Figure 1, with the exception that the link hereafter to be described is pivoted at a center more remote from the free end of the tube than that shown in Figure 1.
Figure 2:
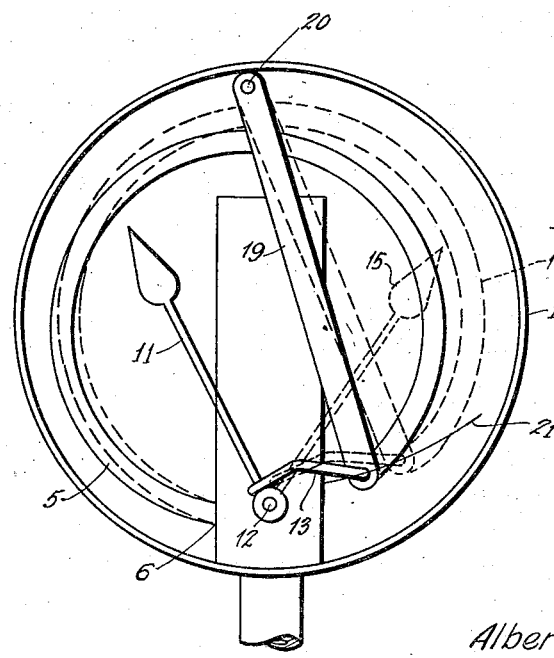

The operation of the device is as follows: Air under pressure, being introduced into the tube, causes the same to expand in a manner heretofore explained. By reason of the fact that the link 8 is pivotally connected between the pivotal point 9 and the free end of the tube, it is impossible for the free end of the tube to move otherwise than in the line of the arc 16, or in the line of the arc 21, as shown in Figure 2. This condition having been established, it is found that a desirable degree of accuracy can be obtained in establishing the relation between the movement of the index hand and a predetermined scale. In practice, the tube is subjected to, say, 60 degrees of pressure, thus causing the index hand to move to a definite position. This 60 degrees of pressure may then be indicated on the scale, and so in like manner greater degrees of pressure may be introduced into the tube, and by noting the movement of the index hand, the proper scale may be established, from which accurate readings may be taken. It is found by experience that the limitation of the movement of the free end of the tube within a prescribed and predetermined arc lends itself to a more accurate operation of the mechanism, and to a high degree compensates for the irregularities incident to the construction of the tube, which more or less affects its flexibility, that is to say, when the free end of the tube is caused definitely to move in a prescribed arc, there is a definite and permanent basis from which to calculate and compute the movement of the index hand under different degrees of air pressure.

While this has been described as useful in connection with determining air pressure, it will of course be understood that it is applicable in connection with any form of gas or any form of liquid under pressure, and while the description herein designates particularly a gauge wherein it is desirable to measure the pressure and leave the hand in a fixed position after the pressure is withdrawn, it will also be understood that it is applicable to that class of gauges wherein it is desirable to have the index hand move backward and forward according to the operation of the free end of the Bourdon tube. In the latter case the free end of the Bourdon tube will be definitely linked to the index hand, thus indicating the rise and fall of pressure as the same occurs. All of these modifications are intended to be within the scope of this invention.

Claim:

In an air pressure gauge of the Bourdon type, a Bourdon tube formed in an approximate circle and anchored at one end to a suitable support, the other end being free for movement, a link pivotally connected at one end to said free end of said tube and also pivotally connected at the opposite end of said link at a fixed point which is the center of a prescribed circle of sufficient dimension to embrace and include the circle in which the Bourdon tube is formed, thus limiting the movement of said free end of said tube to a movement in the arc of said prescribed circle, means secured to the free end of said tube to impart movement of the free end of said tube to an index hand adapted to be associated with a suitable scale.

Signed by me at New York, N. Y., this 24th day of April, 1928.

ALBERT E. CARLISS.